US006961897B1

(12) United States Patent
Peel, Jr. et al.

(10) Patent No.: US 6,961,897 B1
(45) Date of Patent: Nov. 1, 2005

(54) SYSTEM AND METHOD FOR INTERACTIVE ELECTRONIC MEDIA EXTRACTION FOR WEB PAGE GENERATION

(75) Inventors: James W. Peel, Jr., Bowie, MD (US); Melanie Langston, Manassas, VA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/494,743

(22) Filed: Jan. 31, 2000

Related U.S. Application Data

(60) Provisional application No. 60/158,129, filed on Oct. 8, 1999, provisional application No. 60/139,129, filed on Jun. 14, 1999.

(51) Int. Cl.[7] ............................................. G06F 15/00
(52) U.S. Cl. .................................. 715/501.1; 715/513
(58) Field of Search ........................... 715/501.1, 530, 715/500, 513; 707/1, 100

(56) References Cited

U.S. PATENT DOCUMENTS

| | | | | |
|---|---|---|---|---|
| 5,937,160 | A * | 8/1999 | Davis et al. ................ | 709/203 |
| 5,983,245 | A * | 11/1999 | Newman et al. ............ | 715/513 |
| 6,304,872 | B1 * | 10/2001 | Chao ............................ | 707/5 |
| 6,343,302 | B1 * | 1/2002 | Graham ..................... | 715/501.1 |
| 6,349,132 | B1 * | 2/2002 | Wesemann et al. ...... | 379/88.17 |
| 6,356,899 | B1 * | 3/2002 | Chakrabarti et al. ........... | 707/5 |
| 6,363,392 | B1 * | 3/2002 | Halstead et al. ............ | 707/102 |
| 6,374,271 | B1 * | 4/2002 | Shimizu et al. .......... | 715/501.1 |
| 6,389,467 | B1 * | 5/2002 | Eyal ............................ | 709/223 |
| 6,393,468 | B1 * | 5/2002 | McGee ........................ | 709/218 |
| 6,411,999 | B1 * | 6/2002 | Tinkler ........................ | 709/224 |
| 6,429,880 | B2 * | 8/2002 | Marcos et al. .............. | 345/744 |
| 6,456,699 | B1 * | 9/2002 | Burg et al. ............... | 379/88.17 |
| 6,529,910 | B1 * | 3/2003 | Fleskes ........................ | 707/10 |
| 6,532,463 | B1 * | 3/2003 | Robbins et al. ................ | 707/9 |
| 6,581,061 | B2 * | 6/2003 | Graham ........................ | 707/10 |
| 6,591,295 | B1 * | 7/2003 | Diamond et al. ........... | 709/217 |
| 6,631,523 | B1 * | 10/2003 | Matthews et al. ............. | 725/53 |
| 6,694,484 | B1 * | 2/2004 | Mueller ....................... | 715/513 |

(Continued)

OTHER PUBLICATIONS

Shipman III et al., Generating web-based presentations in spatial hypertext, ACM 1997, pp. 71-78.*

(Continued)

*Primary Examiner*—Stephen Hong
*Assistant Examiner*—Cong-Lac Huynh
(74) *Attorney, Agent, or Firm*—Whitham, Curtis & Christofferson, P.C.

(57) ABSTRACT

A system and method for parsing an electronic media database structure to produce tagged data that preserves the content, links, and electronic media structure. In particular, HyperText Markup Language (HTML) data is generated as an Interactive Electronic Technical Manual (IETM) (home page) linked into a relative structure of Web pages to support IETM deployment. An extraction process assesses the functionality associated with each node designated for presentation and builds a virtual Web, based on attributes stored in the IETM database. A series of Web pages with links that hierarchically presents IETM data at run time is produced. The method supports a data warehousing strategy that converts any data type eligible within the relational database. This expands support across multiple types of technical and engineering data. The preferred implementation utilizes a relative addressed pure HTML solution viewable in standard Web browsers. This open system implementation is cross platform and infrastructure independent, requiring no special server software. Retaining the hierarchical structure dictated by the relational database in HTML output enhances the supportability and maintainability of the Web implementation. Updates to this Web implementation can be incrementally applied within the hierarchy (small sections of data) or the entire logical sections of Web data.

15 Claims, 16 Drawing Sheets

U.S. PATENT DOCUMENTS

| | | | |
|---|---|---|---|
| 6,714,931 B1 * | 3/2004 | Papierniak et al. | 707/10 |
| 2001/0016846 A1 * | 8/2001 | Chakrabarti et al. | 707/102 |
| 2002/0087577 A1 * | 7/2002 | Manjunath et al. | 707/104.1 |
| 2002/0103920 A1 * | 8/2002 | Berkun et al. | 709/231 |
| 2002/0124100 A1 * | 9/2002 | Adams | 709/232 |
| 2002/0138591 A1 * | 9/2002 | Reynolds et al. | 709/218 |
| 2003/0110163 A1 * | 6/2003 | Chen et al. | 707/3 |
| 2003/0191817 A1 * | 10/2003 | Fidler | 709/219 |

OTHER PUBLICATIONS

Dennis et al., Technical issues in hypermedia authoring systems extended abstract, IEEE 1996, pp. 373-378.*

Hand, Creating hypermedia documents by doing an alternative to authoring, IEEE 1995, pp. 1-3.*

Ginige et al., Hypermedia authoring, IEEE 1995, pp. 24-35.*

Ouahid et al., Converting Web Pages into Well-formed XML Documents, IEEE 1999, pp. 676-680.*

AIMSS, "User's Guide Supplement", by Hughes Technical Services Company, Version 3.1, Feb. 1997.

EBT, "Electronic Book Publishing and Delivery System", Product Brochure, 1993 copyright.

* cited by examiner

```
1666.html - Notepad
File  Edit  Format  View  Help

<HTML><HEAD><TITLE>35U Cabinet Cooling Fan Assembly R&R
Procedure</TITLE><CENTER><A
NAME="0"></A><H1>35U Cabinet Cooling Fan Assembly R&R
Procedure</CENTER></H1><HR WIDTH='100%'
SIZE='5'></HEAD><BODY>
<A NAME="1"></A><P>INPUT CONDITIONS:
<A NAME="2"></A><P>Personnel Recommended:   2
<A NAME="3"></A><P>2 Maintenance Technicians
<CENTER><TABLE BORDER=2 CELLPADDING=3>
<TR VALIGN="CENTER"><!--Begin table header data-->
<TH>Description</TH>
<TH>Part Number</TH>
<TH>Equipment NSN</TH>                              }1201
<TH>CAGE Code</TH>
</TR><!--End of header data-->
    <TR ALIGN="LEFT" VALIGN="TOP"><!--Begin row 1 data-->
    <TD>   Nutdriver,5/16-inch</TD>
    <TD>   A-A-2382</TD>
1205<TD>   5120002930796</TD>                       }1202
    <TD><A HREF='../../1/57/258.html#7'>    58536</A></TD>
    </TR><!--End of Row 1-->
    <TR ALIGN="LEFT" VALIGN="TOP"><!--Begin row 2 data-->
    <TD>   Nutdriver,3/8-inch</TD>
    <TD>   A-A-2382</TD>
1205<TD>   5120002221499</TD>                       }1203
    <TD><A HREF='../../1/57/258.html#7'>    58536</A></TD>
    </TR><!--End of Row 2-->
    <TR ALIGN="LEFT" VALIGN="TOP"><!--Begin row 3 data-->
    <TD>   Pliers, cutting, 6-inch
    </TD>
1205<TD>   A-A-2330</TD>                            }1204
    <TD>   5110002222708</TD>
    <TD><A HREF='../../1/57/258.html#7'>    58536</A></TD>
    </TR><!--End of Row 3--> start              1666.html - Notepad
```

Figure 12

```
225.html - Notepad
File  Edit  Format  View  Help

<HTML><HEAD><TITLE>35U Cabinet Cooling Fan Assembly
Controls Photo</TITLE><CENTER><A NAME="0"></A><H1>
35U Cabinet Cooling Fan Controls Photo</CENTER></H1>
<HR WIDTH='100%' SIZE='5'></HEAD><BODY>
<CENTER><IMG SRC="../../graphics/PHOTOS/P00ba01a.gif"
ismap usemap="#image.map" border=0>                    ⎫1301
<!--Hotspot links inside image map-->
<MAP NAME="image.map">
<AREA SHAPE=rect HREF="../../1/60/226.html#0"
TARGET="_top" ALT="35U Cabinet Cooling Fan Assembly
Power Switch" COORDS="335,26,441,129">⎤1302
</CENTER></MAP>
<!--Button Data--><P><P><CENTER><P></CENTER>⎤
</BODY></HTML>                                 ⎦1303
```

*Figure 13*

180.html - Notepad

File  Edit  Format  View  Help

```
<HTML><HEAD><TITLE>ADB Controls and Indicators</TITLE><CENTER>
<A NAME="0"></A><H1>ADB Controls and Indicators</CENTER></H1>
<HR WIDTH='100%' SIZE='5'></HEAD><BODY>
<A NAME="1"</A><P>The ADB Hardware Configuration Item has no unique
controls or indicators. It uses the controls and indicators of its components:
<A NAME="2"</A><P>1. 35U Cabinet Cooling Fan Assembly
<P><A HREF='../../1/82/225.html#0'>35U Cabinet Cooling Fan Assembly
Controls Photo</A>
<A NAME="3"</A><P>2. Power Distribution Unit
<P><A HREF='../../1/82/224.html#0'>PDU Controls and Indicators Photo</A>
<A NAME="4"</A><P>3. Dual Disk Expansion Chassis Assembly - Front
<P><A HREF='../../1/82/278.html#0'>Disk Expansion
Chassis Assembly Controls and Indicators Photo</A>
<A NAME="5"</A><P>a. Disk Drive Assembly
<P><A HREF='../../1/82/277.html#0'>Disk Drive Assembly Controls and
Indicators Photo</A>
<A NAME="6"</A><P>4. Dual Disk Expansion Chassis Assembly - Rear
<P><A HREF='../../1/82/240.html#0'>Disk Expansion
Chassis Assembly Rear Panel Controls Photo</A>
<A NAME="7"</A><P>5. Disk Expansion Chassis Assembly - Front
<P><A HREF='../../1/82/276.html#0'>Disk Expansion Chassis Assembly
Controls and Indicators Photo</A>
<A NAME="8"</A><P>a. Disk Drive Assembly
<P><A HREF='../../1/82/277.html#0'>Disk Drive Assembly Controls and
Indicators Photo</A>
<A NAME="9"</A><P>6. Disk Expansion Chassis Assembly - Rear
<P><A HREF='../../1/82/240.html#0'>Disk Expansion Chassis Assembly Rear
Panel Controls Photo</A>
<A NAME="10"</A><P>7. Phase-2 CPU Chassis - Front
<P><A HREF='../../1/82/230.html#0'>CPU Chassis Controls and Indicators
Photo</A>
<A NAME="11"</A><P>a. Disk Drive Assembly
<P><A HREF='../../1/82/277.html#0'>Disk Drive Assembly Controls and
Indicators Photo</A>
<A NAME="12"</A><P>8. Phase-2 CPU Chassis - Rear
<P><A HREF='../../1/82/243.html#0'>CPU Chassis Rear Panels Controls and
Indicators Photo</A>
<A NAME="13"</A><P>a. FDDI Printed Circuit Board Assembly.
<P><A HREF='../../1/82/805.html#0'>FDDI Printed Circuit Board Indicators
Photo</A>
</BODY></HTML>
```

*Figure 14*

SYSTEM AND METHOD FOR INTERACTIVE ELECTRONIC MEDIA EXTRACTION FOR WEB PAGE GENERATION

CROSS-REFERENCE TO RELATED APPLICATIONS

This application is related to provisional patent application Ser. No. 60/139,129 entitled "IETM HTML Extract Application" filed Jun. 14, 1999 and Ser. No. 60/158,129 entitled "System and Method for Interactive Electronic Media Extraction for Web Page Generation" filed Oct. 8, 1999 the entire subject matter of which is incorporated herein by reference.

BACKGROUND OF THE INVENTION

1. Field of the Invention

The present invention generally relates to display of Interactive Electronic Media and, more particularly, to a method for parsing a database structure to produce tagged data that preserves the content, links, and structure of the original electronic media description.

2. Background Description

An initiative was started in the 1970's in the U.S. Department of Defense (DoD) to create a paperless ship environment for technical manuals. Originally the documents were raster scanned paper documents. In 1992, three Interactive Electronic Technical Manual (IETM) standards were approved by the DoD. Currently, the U.S. DoD specification, MIL-PRF-87269, "Data Base, Revisable: Interactive Electronic Technical Manuals, For the Support Of" is currently the only available published standard for developing IETMs.

Interactive Electronic Technical Manuals (IETMs) are designed to enable a technician to walk through maintenance procedures in a logical sequence and through fault isolation techniques. An Interactive Electronic Technical Manual (IETM) can be one of the many by-products of Standard Generalized Markup Language (SGML)/eXtensible Markup Language (XML) content tagged data. The use of databases and legacy data for system maintenance/repair combined with SGML/XML tagged content can result in an IETM.

There are a number of varieties of IETMs in existence today. Each variation stores a description of the technical manual in a database structure. Some systems may use primitive flat file directory structure and some use more sophisticated relational databases. The stored data is in accordance with the DoD standard, but each system typically uses custom software to retrieve the data and create an interactive session of the manual or document. A technician views the manual on a terminal connected, either directly or via a network, to a host computer on which the database resides. As the technician makes interactive choices regarding which pages or procedures to view, additional data is retrieved from the database in order to format the requested pages.

It has been determined that relational database IETMs enhance data maintainability, thus reducing management costs, and is the best solution for large-scale IETM applications. These applications use tools applicable to Database Management Systems (DBMS), most of which have proprietary data-replication facilities, typically utilize network protocols and procedures different from those used by the World Wide Web, and as such, are not compliant with an interoperable architecture. In particular, Class 4 IETM applications require the services of a separate DBMS as well as the presentation method that is encapsulated in the IETM.

A class 4 IETM represents the group of hierarchically structured IETMs. Class 4 IETMs represent the primary desired IETM class for new acquisition programs currently being procured by the U.S. Navy. Class 4 is a complete departure from previous classes whose data is structured to support a classical publishing environment based on sentence, paragraph, chapters, pages, etc. Class 4 data is created and managed as hierarchical objects within a database. Class 4 IETMs are not bound by a predetermined sequence of presentation, and by building a hierarchical database structure provides the logic and the linkage among and between data that is inherently integral to hierarchical databases. Data is created once with no duplication. Links are provided between the IETM elements controlling navigation and allowing the user a customized view of data.

There are several known problems or disadvantages of viewing IETMs according the state of the art methods. For instance, IETM application developers utilize proprietary viewers for their IETM data. The Web solution for their IETMs require the services of a separate database management system (DBMS), as well as presentation methods that encapsulate the IETM presentation. These methods utilize specialized server and client software, creating additional infrastructure burdens, and resulting in cost and maintenance impacts associated with the products development. Thus, there is a need to enhance cross platform support and technical data interoperability. Class 4 IETMs are difficult to manage in a Web environment.

FIG. 1 shows a state of the art process for presenting an IETM to a user. First, a technical manual is described 100 by a series of functional descriptions, links, graphics and other data as necessary to fully describe a document. An authoring tool 102 is used to convert this description into a database 104. There are several authoring tools available as commercial off the shelf (COTS) products, such as AIMMS™ available from Raytheon Corporation of Lexington, Mass., DynaText® (available from INSO® Corporation of Providence, R.I., and Guide available from InfoAccess™ Inc. of Belleview, Wash. Each tool uses its own database format, some of which are merely directory structures containing files, and some may be relational databases. A presentation tool 106 is then required to retrieve the manual description from the database 104 and display the information to the user 108. Information displayed can be graphical 109 or textual 110, as defined in the database 104. These current systems are often inefficient and inadequate for standalone user environments for the reasons stated above.

SUMMARY OF THE INVENTION

The aforementioned problems with presenting an IETM in a standalone environment and other problems with the prior art as described in the detailed description, below, are addressed by the present invention and will be understood by reading and studying the following specification. A method for parsing an electronic media database structure to produce tagged data is described which preserves the content, links, and electronic media structure such that the tagged data can be viewed using standard web browsers on a stand alone system. This method also provides an electronic media database structure that allows a user to view the electronic media using traditional IETM presentation methods.

Another advantage of the present invention is that it provides a method for efficiently updating the stand alone versions of electronic media when the database is modified to reflect changes in the electronic media, or technical manuals.

In particular, an illustrative embodiment of the present invention produces HTML data as an IETM (home page) linked into a relative structure of Web pages to support IETM deployment. The extraction process assesses the functionality associated with each node designated for presentation and builds a virtual Web, based on attributes stored in the IETM database. A series of Web pages with links that hierarchically presents IETM data at run time is produced. The preferred embodiment supports a data warehousing strategy that converts any data type eligible within the relational database. The data warehousing strategy implementation stores data in a non-application specific environment and allows any data currently stored in the database to be included in the presentation to the user regardless of the origin of the data. This format free approach to data storage enhances the lifecycle of the data. This expands support across multiple types of technical and engineering data.

The preferred embodiment of a Web IETM implementation utilizes a relative addressed pure HTML solution viewable with a standard Web browser. This open system implementation is cross platform and infrastructure independent, requiring no special server software. Retaining the hierarchical structure dictated by the relational database in HTML output enhances the supportability and maintainability of the Web IETM implementation. Updates to this Web IETM implementation can be incrementally applied within the hierarchy (small sections of data) or the entire logical sections of Web data and sent to the user using many convenient methods, including via e-mail.

According the preferred embodiment, an IETM database is parsed to identify whether a data object is of type menu, narrative, graphic, table, or procedure. If the data object is a menu type, a starting menu is created. The data object information is selected from the Database. An HTML file representing the data object is created. Any links found within the data object information are stored for later processing. The saved links are then processed. Procedure objects are recursively parsed to account for exited-to procedures and yes/no decision branches in the procedure.

BRIEF DESCRIPTION OF THE DRAWINGS

The foregoing and other objects, aspects and advantages will be better understood from the following detailed description of a preferred embodiment of the invention with reference to the drawings, in which:

FIG. 12 is an excerpt of HTML code generated by the Extract process for a table object;

FIG. 13 is an excerpt of HTML code generated by the Extract process for a graphic object;

FIG. 14 is an excerpt of HTML code generated by the Extract process for a text object.

DETAILED DESCRIPTION OF A PREFERRED EMBODIMENT OF THE INVENTION

In the following detailed description of the illustrative embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
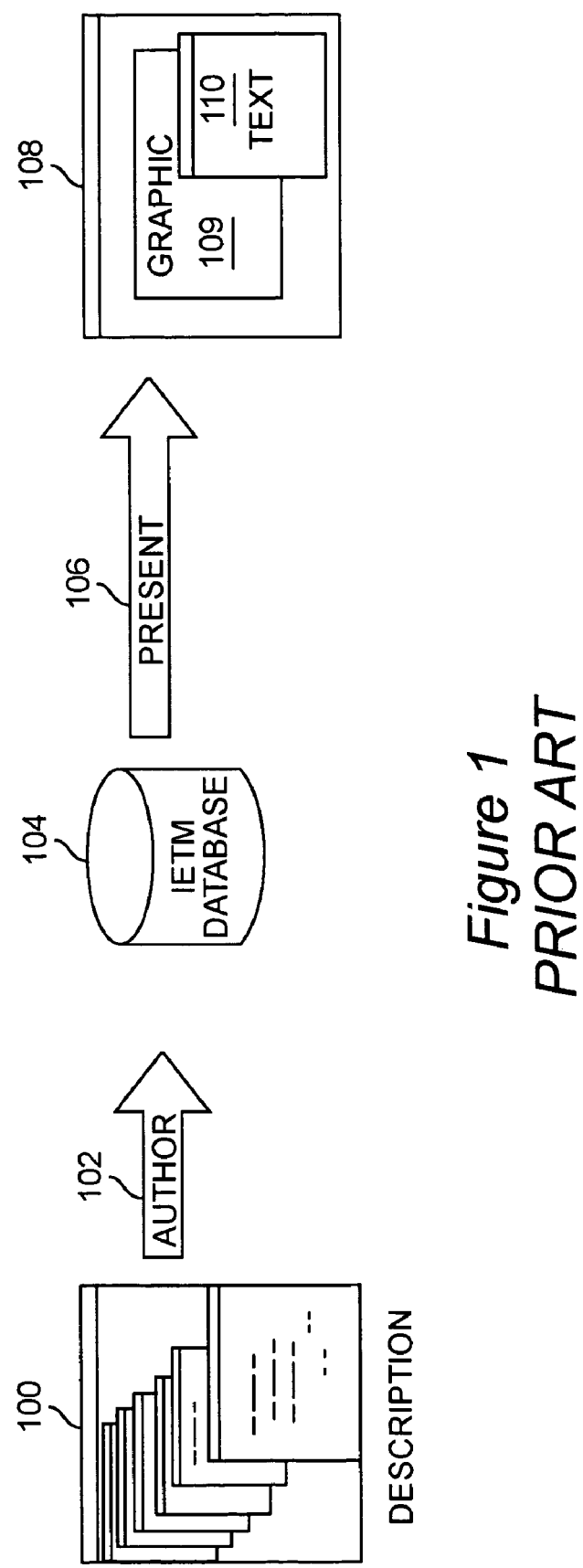
FIG. 1 illustrates a state of the art system for displaying an Interactive Electronic Technical Manual.
Figure 2:
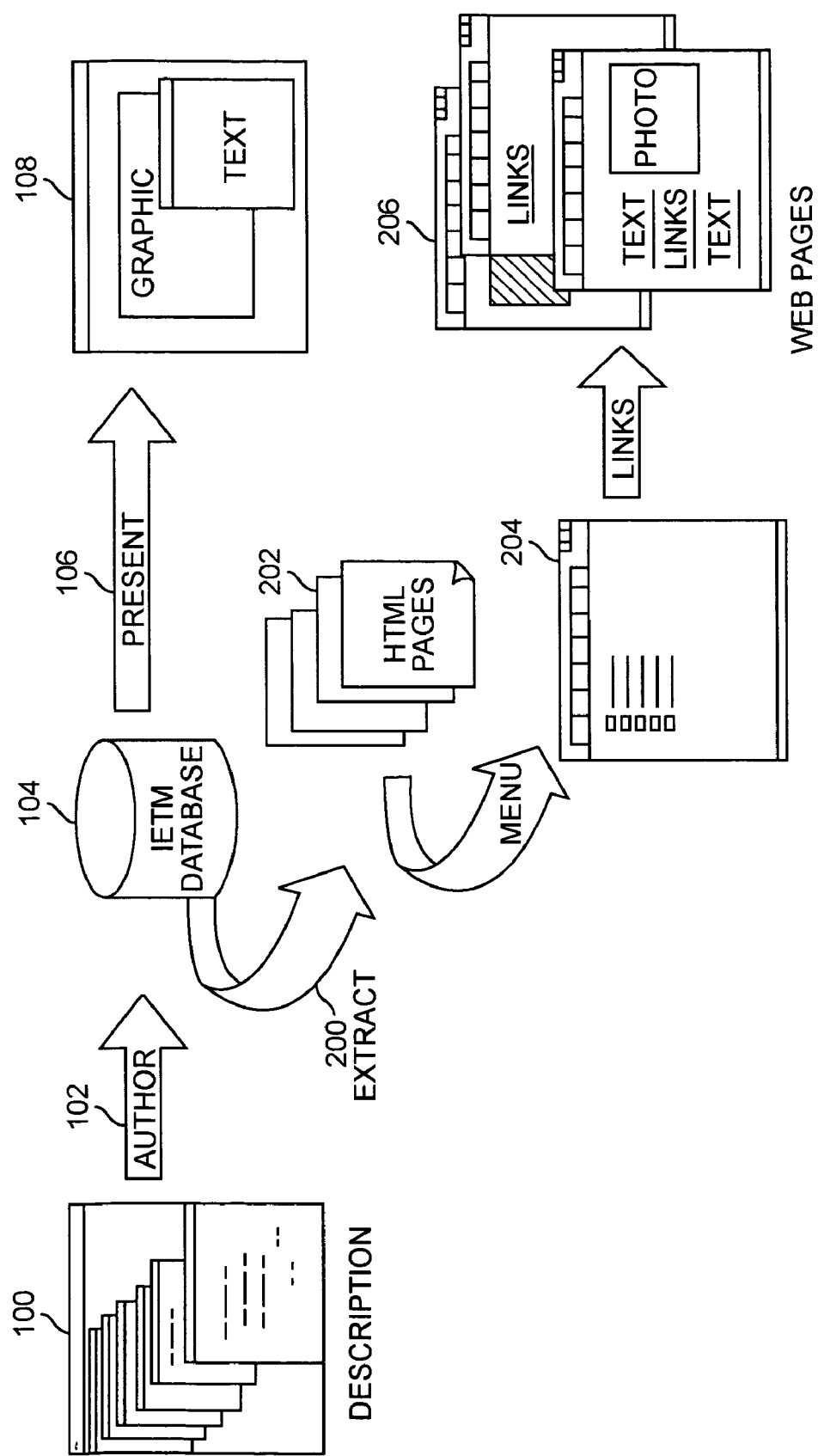
FIG. 2 illustrates a system for extracting an Interactive Electronic Technical Manual description and generating Web pages.

Referring again to the drawings, and more particularly to FIG. 2, there is shown an overview of the preferred embodiment of the present invention. The method utilizes a database enabled authoring and presentation system for development and display of technical documentation. These applications are Windows™ based and present Menus, Graphics, Text, Table and Procedure data to support user needs in operation and maintenance for the deliverable systems. (Windows is a trademark of Microsoft Corp.)

In order to produce a Web presentation 206 for IETM solutions operating in a Web architecture, an HTML Filter (Extract Application) 200 creates a pure HTML-based presentation 202 from the IETM database 104. IETM authoring activities 102 are able to continue as normal, retaining advantages of the DBMS 104 for development, but IETM deliveries are extracted 200 to create a Web browser-viewable presentation 202.

The presentation 202 consists of an IETM "Home Page" 204 that references a structure of Web pages that support IETM deployment. The Web page structure uses "relative address" structure, meaning that the entire Web can be relocated to any machine, in any directory, and the hyperlinks, or uniform resource locators (URLs) still operate as desired. The Extract or filtering process 200 assesses the functionality and data type associated with each IETM data Node designated for presentation, and builds a virtual Web, based on the attributes and data stored in the relational database 104. This results in a series of Web pages 204 and 206 with links that hierarchically present the information at run time. This implementation estranges, or separates, the IETM presentation system from the DBMS and produces an infrastructure independent deployment model. Utilizing pure HTML (standard Web pages) is an advantage because it produces a thin server/client IETM deployment that is cross platform compatible.

The Extract process reads IETM data stored in an IETM relational database and generates a relative addressed Web comprising HTML pages hyper-linked together to preserve the structure of the IETM. The Extract application of the preferred embodiment processes five (5) different types of IETM objects: menus, text, tables, graphics and procedures.

Figure 3:
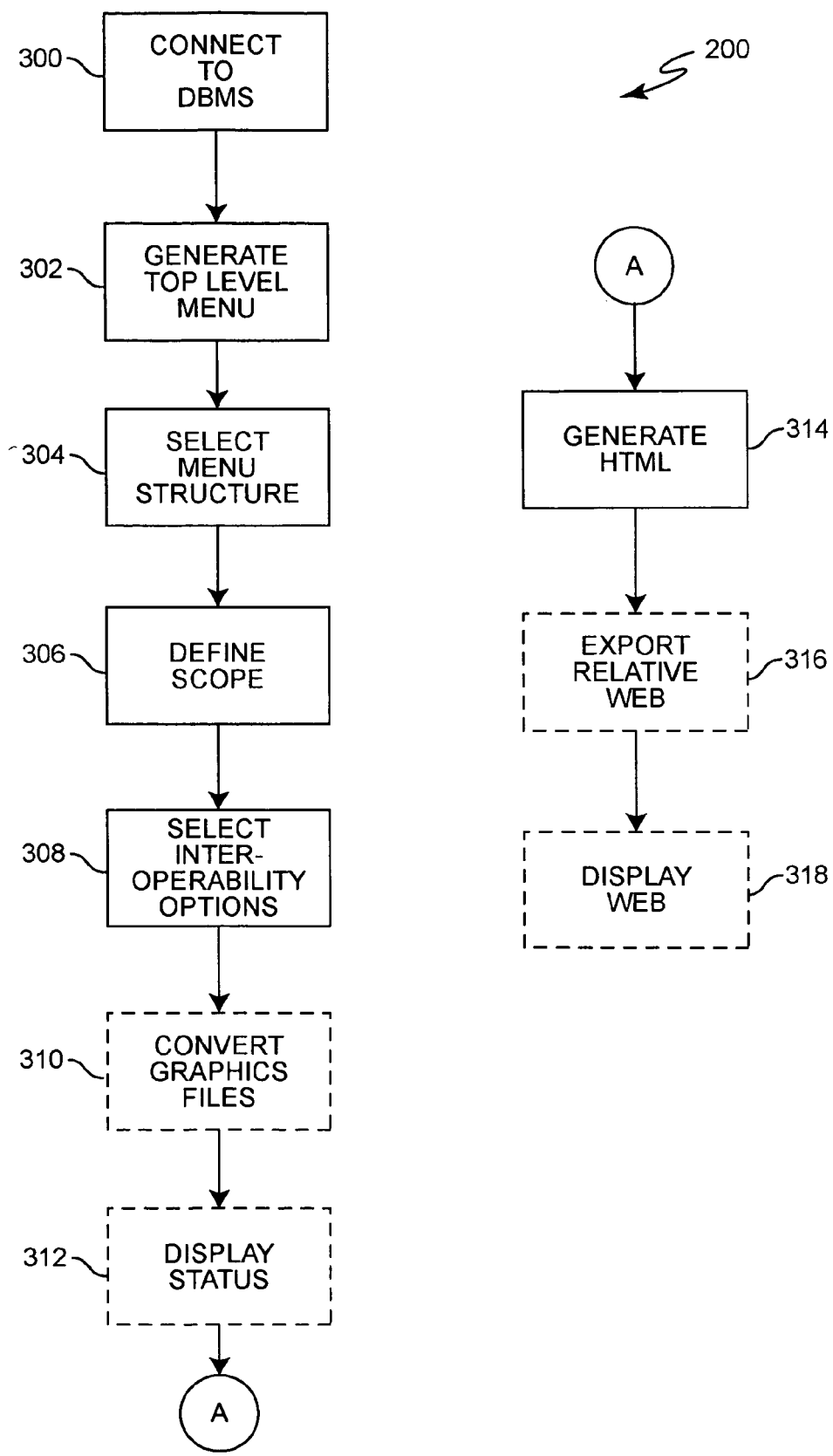
FIG. 3 is a flow diagram of the method of the present invention.

Referring now to FIG. 3, a flow diagram of the Extract process 200 of FIG. 2 is shown. The Extract process connects to the DBMS utilizing operator-defined protocols and controls identified in an initialization file, Extract.ini, resident with the application. An example Extract.ini is shown below, with comments in brackets "{ }".

```
[Database]
DBMS=MSS (Msoft) SQL Server 6.0    {identifies the database
                                    management system where the
                                    IETM database resides}
Database=ARCI       {registered name of the database with which to
                     connect}
UserId=             {user login (secure data source only)}
DatabasePassword=   " "
LogPassword=
ServerName=medialab {domain name of the server where database
                     resides (remote database only)}
LogId=sa            {database user ID}
Lock=
DbParm=Connectstring='DSN=Sqlserlmfsauth'   {Connect string based
                                             on data server name as
                                             registered in the
                                             environment}
Prompt=0
DblniFile="lmfsauth.ini"
[Path]
PathDir=g:\extract  {location to output html data}
GraphicsPath=GRAPHICS\  {when deployed, relative address of images.
                         when processing HTML file that contains an
                         image, this information is appended to the
                         image name to provide accurate relative
                         path}
[basePaths] {Collection of applications and items that are eligible for
             Launching from the IETM content. Example 'PDF=legacy'
             PDF (Portable Document Format) is the launch type and
             legacy is the basepath. When a launch type of PDF is
             encountered during extract, the basepath is appended to the
             file name in the HTML to indicate where the source file can
             be located. (similar process as images).
CBT=CBT
PDF=legacy
Legacy=Legacy
OpsWeb=Web
IETM=IETM
AVI=media
```

Figure 4:
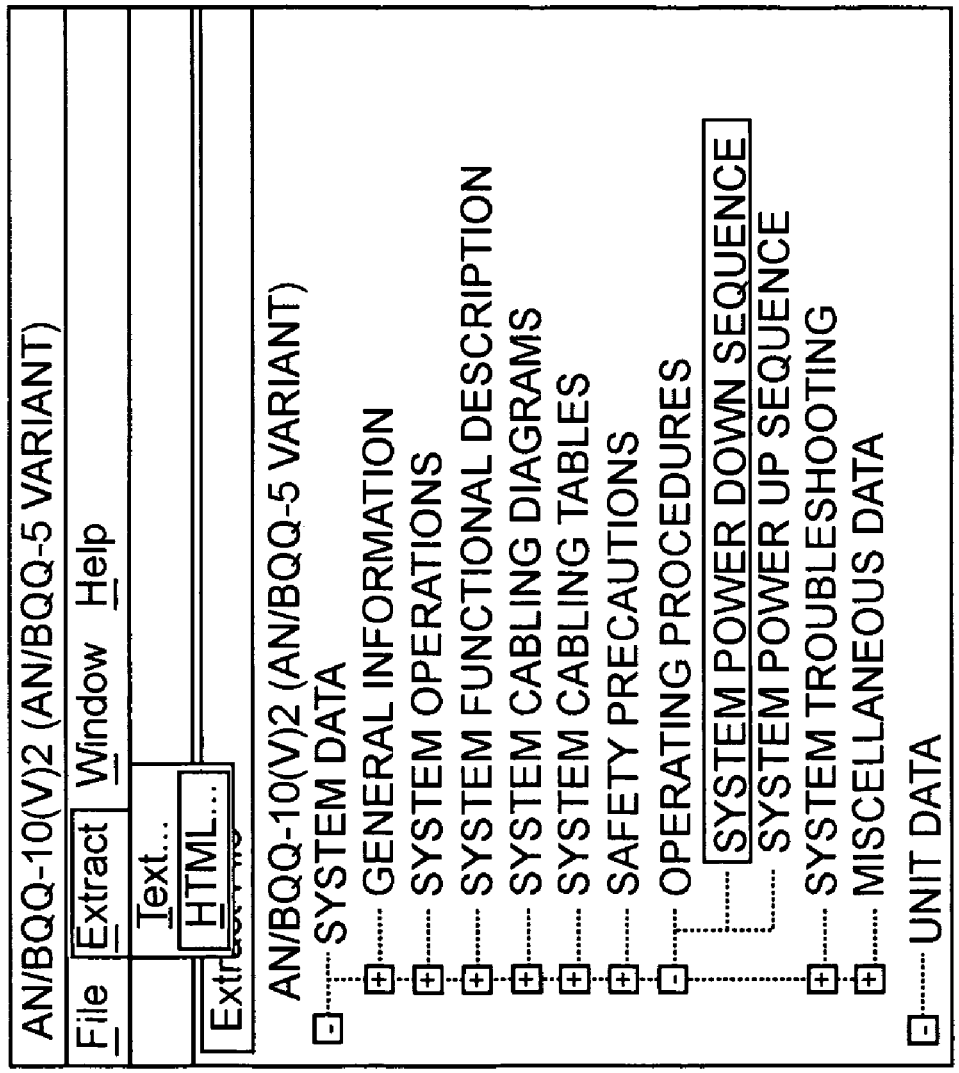
FIG. 4 shows the dialog box used to select the menu hierarchy to be extracted.

A top level menu is generated in function block 302 to provide the user with a hierarchical view of the IETM menu items. This menu provides navigation through various levels of the hierarchy. The user highlights a section of the IETM menu to define the point in the menu structure to initiate the extract process in function block 304. Using pull-down menus, the user selects the process to initiate, for instance as shown in FIG. 4, HTML is the selected (highlighted) process.

Figure 5:
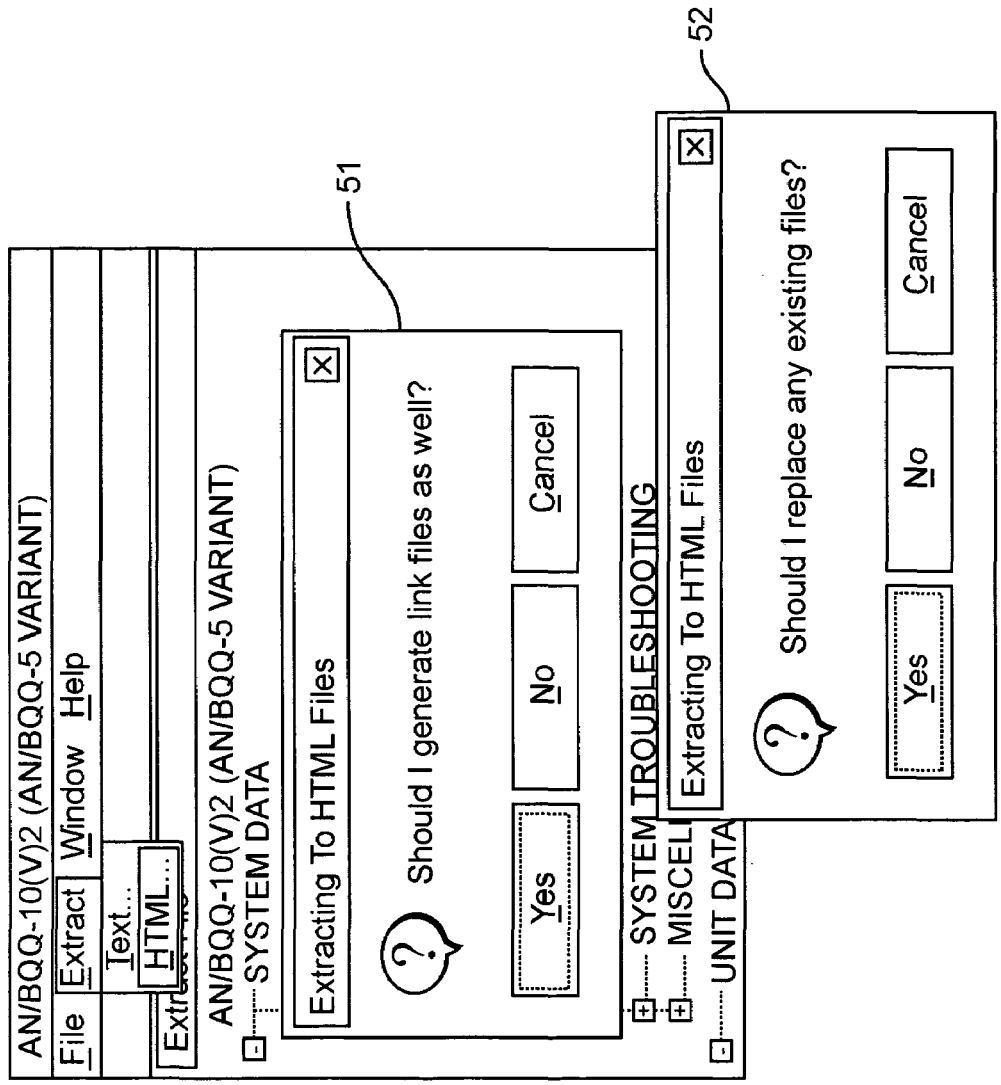
FIG. 5 shows dialog boxes used to define the scope of the Extract process.

Once the Extract process is initiated, the user makes selections for controls to define the scope associated with the extraction to HTML process in function block 306. These controls are presented in easy to understand dialogue boxes as shown in FIG. 5. These controls allow the user to make decisions associated with how the HTML will be generated. Based on user selections, a defined menu structure may be designated, or previously generated HTML files may be skipped.

If the user chooses to generate link files in dialog box 51, all links (or data resources) required for this page or menu will be extracted. The hierarchy is extracted to a logical end. If the user chooses not to generate link files in dialog box 51, then only the top level menus are generated. This is efficient if the document has been previously generated in incremental pieces. If the user chooses to replace existing files in dialog box 52, then all previously created HTML files are assumed to have changed and will be regenerated and old files are overwritten. Otherwise, the old files are not overwritten as new files are generated. The user may also choose to generate a text file containing a list of all graphics and photo files which are referenced in the database for easy conversion later.

Figure 6:
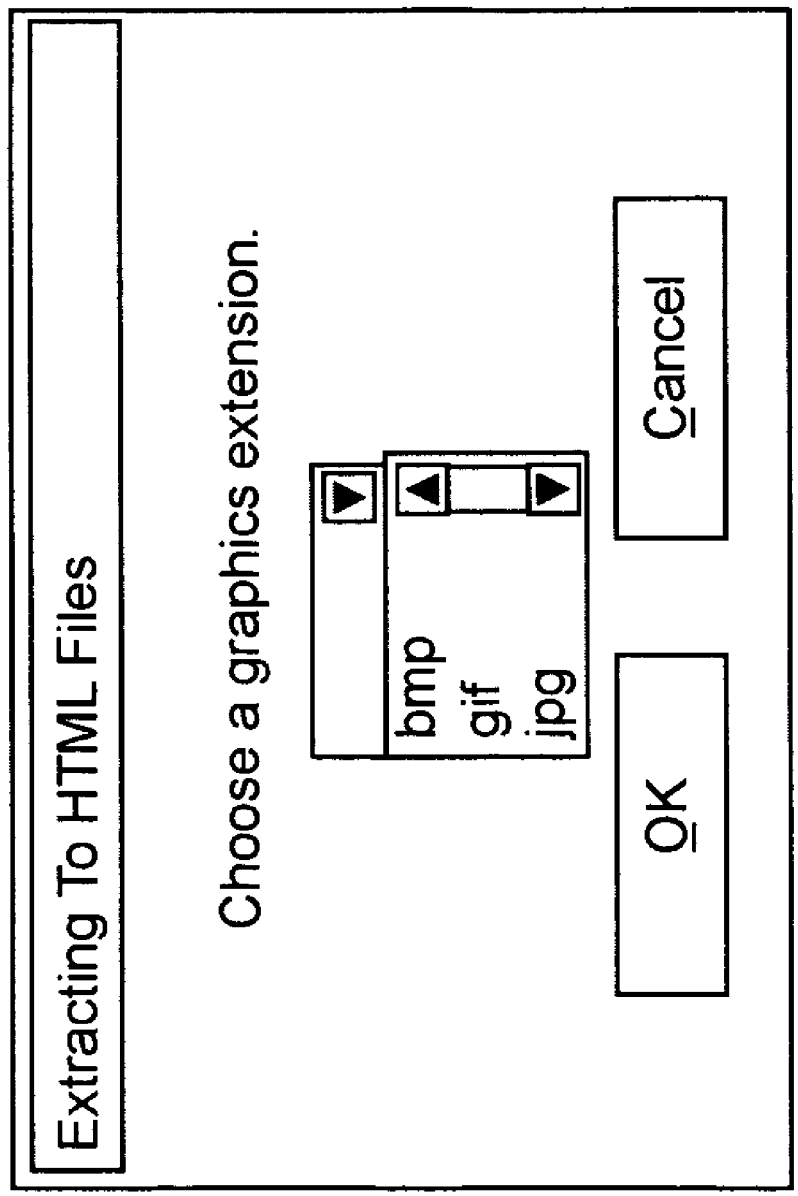
FIG. 6 shows the dialog box used to select the graphics file extension.

To enhance cross platform compatibility of the extracted Web IETM, the user is provided a dialog selection that enables the selection of a graphics format to be deployed 308, as shown in FIG. 6. This selection ensures that graphic filenames referenced in the HTML files will be consistent with the deployed graphics images. Regardless of the graphics file extension referenced in the IETM database, this selection substitutes the selected graphics extension during the HTML Extract process. This process also "normalizes" the extension case, adding cross platform functionality.

The graphics in the IETM database could be in any number of formats. The graphics files need to be converted to the selected deployed format 310. In the preferred embodiment, once the user selects the scope of the Extract process, a file may be optionally created that lists every graphic referenced within this hierarchy. This list is used to ensure that only the graphics files actually used are converted. This conversion may be done manually using any number of conversion tools known to one skilled in the art, or it could be implemented as an automatic procedure that reads from the previously generated graphics file list. Because COTS graphics formats are prone to change without notice, the preferred embodiment uses the manual method of conversion to avoid unforseen compatibility problems.

Although the preferred embodiment of the invention allows interactive selections by a user, it would be apparent to one skilled in the art how to modify the procedure to allow predefined or default controls.

Figure 7:
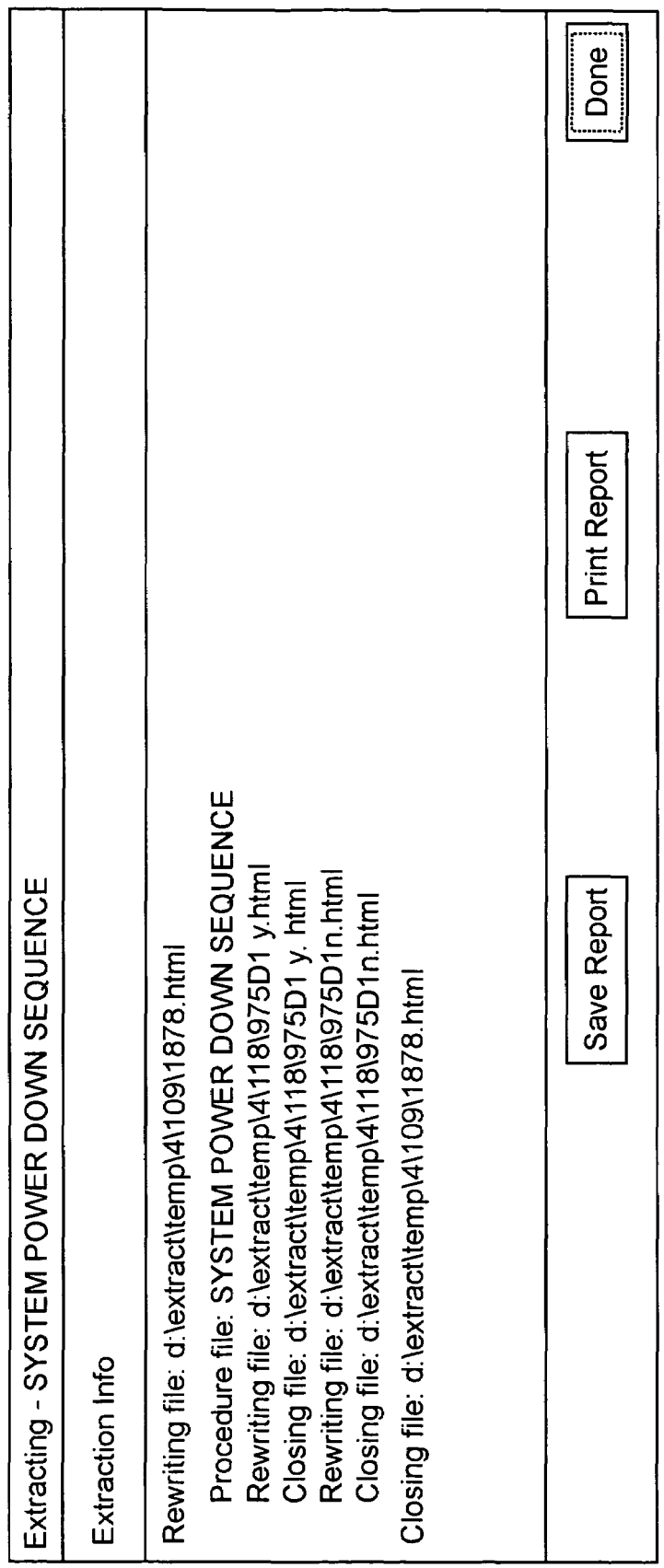
FIG. 7 shows the status report dialog box of the Extract process.

While the HTML Extract process is running, the user is presented with a real-time updating dialog that indicates the progress of the automatic procedure 312, as shown in FIG. 7. All files created are listed, to indicate how far along the process is. This report identifies any errors associated with the Extract process. These errors include data inconsistencies, code errors, and resource descriptions. An Extract Report can be saved to a text file or printed for future evaluation.

Figure 8:
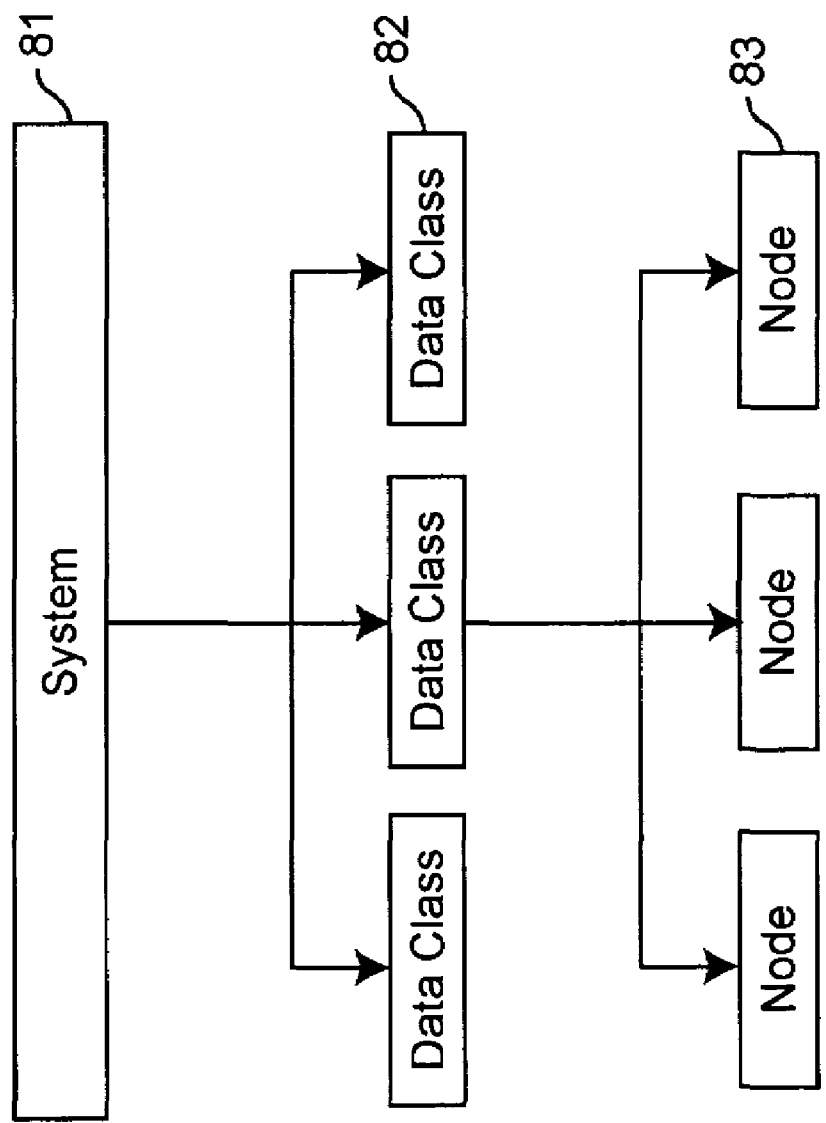
FIG. 8 shows the IETM database structure.

The nature and structure of information in an IETM database requires some definition of terms to describe data within the database environment and the specific use of the Extract process. The hierarchical associations defined in the IETM database are defined in Levels. FIG. 8 presents the terms and implied associations to be referenced throughout the following description.

Referring now to FIG. 8, the IETM database structure organizes nodes in a hierarchical structure that supports authoring and presentation of data. A defined system level node 81 defines the parent or top hierarchical level of the relational database. Data classes 82 are compartments, or database storage bins defined under a system. Each data class has an associated "edit type" defining the type of data stored in the database. Valid data types are Menu,
Text,
Graphics,
Tables, and
Procedures.

Nodes 83 are the actual database data elements stored in the database. The IETM authors import or edit the data under various data classes. Nodes are stored as plain text in a format free environment. The nodes are parented to a data class retaining the hierarchy of the data.

Figure 9:
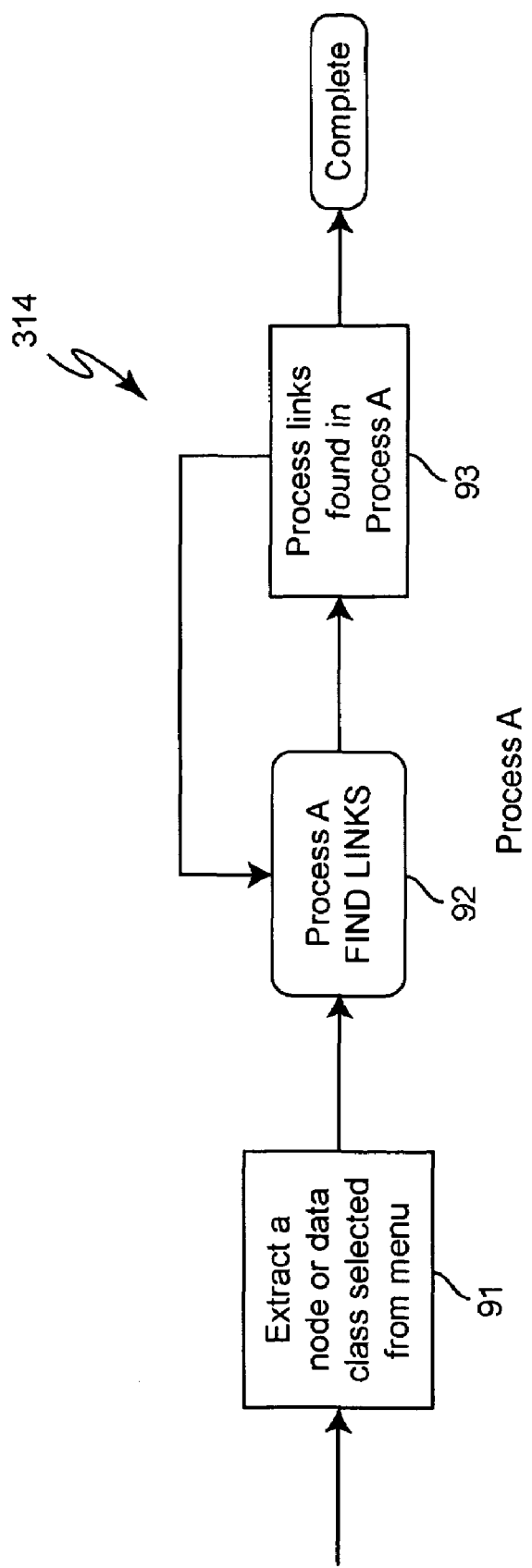
FIG. 9 is a flow diagram of the general method of the Extract process.

Referring again to FIG. 3, when extracting the data from DBMS control to HTML in function block 314, it is important to retain as much of the database structure as possible to enhance data reusability. This is accomplished by implementing a Web structure that closely mimics the database while conforming to HTML relative addressing rules. FIG. 9 illustrates the general flow of the Extract process.

Recalling that a menu structure was selected in 304 of FIG. 3, the process then extracts a node or data class selected from the menu in block 91. The links in the selected menu structure are identified in block 92. When the links are identified in block 92, as described further below, four pieces of information are saved in array: the system id, class id, node id and name of the IETM object. These four pieces of information are saved in the array only if they are not contained in the array currently. After the identification process terminates, the array of saved links is processed in block 93.

In a preferred embodiment of the invention, the identification process is called for each saved link, to create the HTML file for the saved system id, class id, and node id. The HTML files generated in block 92 contain links to other HTML pages via the use of anchor tags. The file, to which the anchor refers, is not created until the link is processed in block 93, calling the process of block 92 for processing. The files created in block 92 are complete and are not modified by the processing in block 93. Postponing the processing of the links is done to free up resources and speed the performance of the extraction. One should note that during the processing of the links in block 93, the process of block 92 is executed and more saved links could be added to the array. Once all of the links have been processed the extract process is complete.

As illustration, suppose IETM object B links to IETM object C. When executing the link identification process for IETM object B and encountering the link to IETM object C, the system id, class id, node id and name of the IETM object C is saved in an array. The identification process completes for IETM object B (all database objects and file objects are closed and destroyed). The saved link for IETM object C is retrieved from the array (block 93) and the identification process (block 92) is called for the IETM object C. If IETM object C links to IETM object D, the link to IETM object D would be saved. The identification process completes for IETM object C (all database objects and file objects are closed and destroyed). The saved link for IETM object D is retrieved from the array (block 93) and the identification process (block 92) is called for IETM object D.

In another embodiment of the invention, processing of the links occurs immediately instead of information being saved in an array. For instance, IETM object B links to IETM object C. When executing the link identification process (block 92) for IETM object B and encountering the link to IETM object C, the identification process is called immediately to create the file for IETM object C. The database objects and file objects associated with the IETM object B are left open until the processing of IETM object C is completed. If IETM object C links to IETM object D, the identification process is called immediately to handle the link to IETM object D. At this point the database objects associated with the IETM object B and IETM object C would be open. Over time, the number of database and file objects could expand rather quickly. It would be apparent to one skilled in the art that various implementations, all falling within the scope of the invention, could be used for identifying and processing the links to create the HTML pages, and that different methods produce varying results with respect to performance.

Figure 10A:
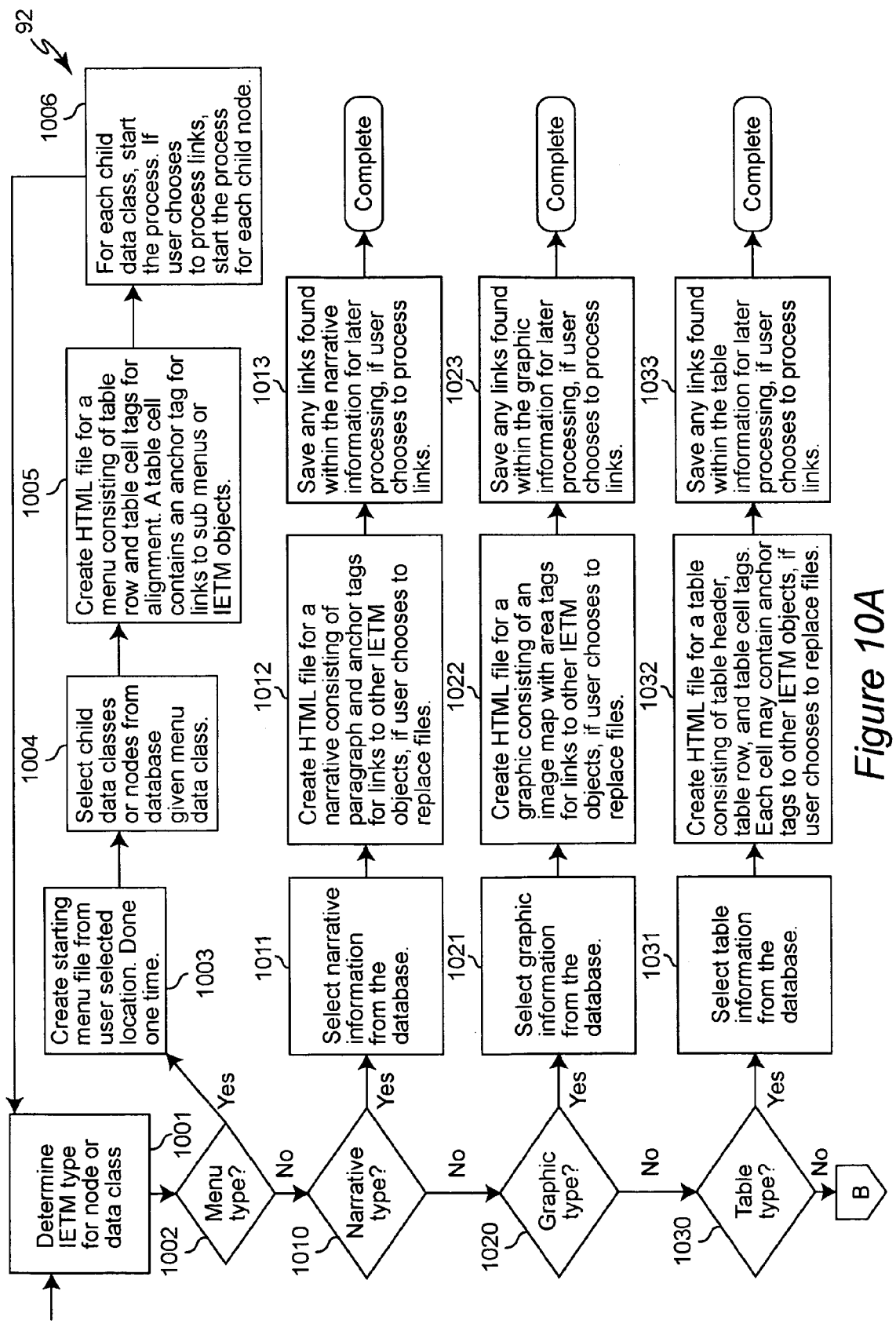
FIGS. 10A and 10B are a flow diagram for the process of parsing the selected node or data class.
Figure 10B:
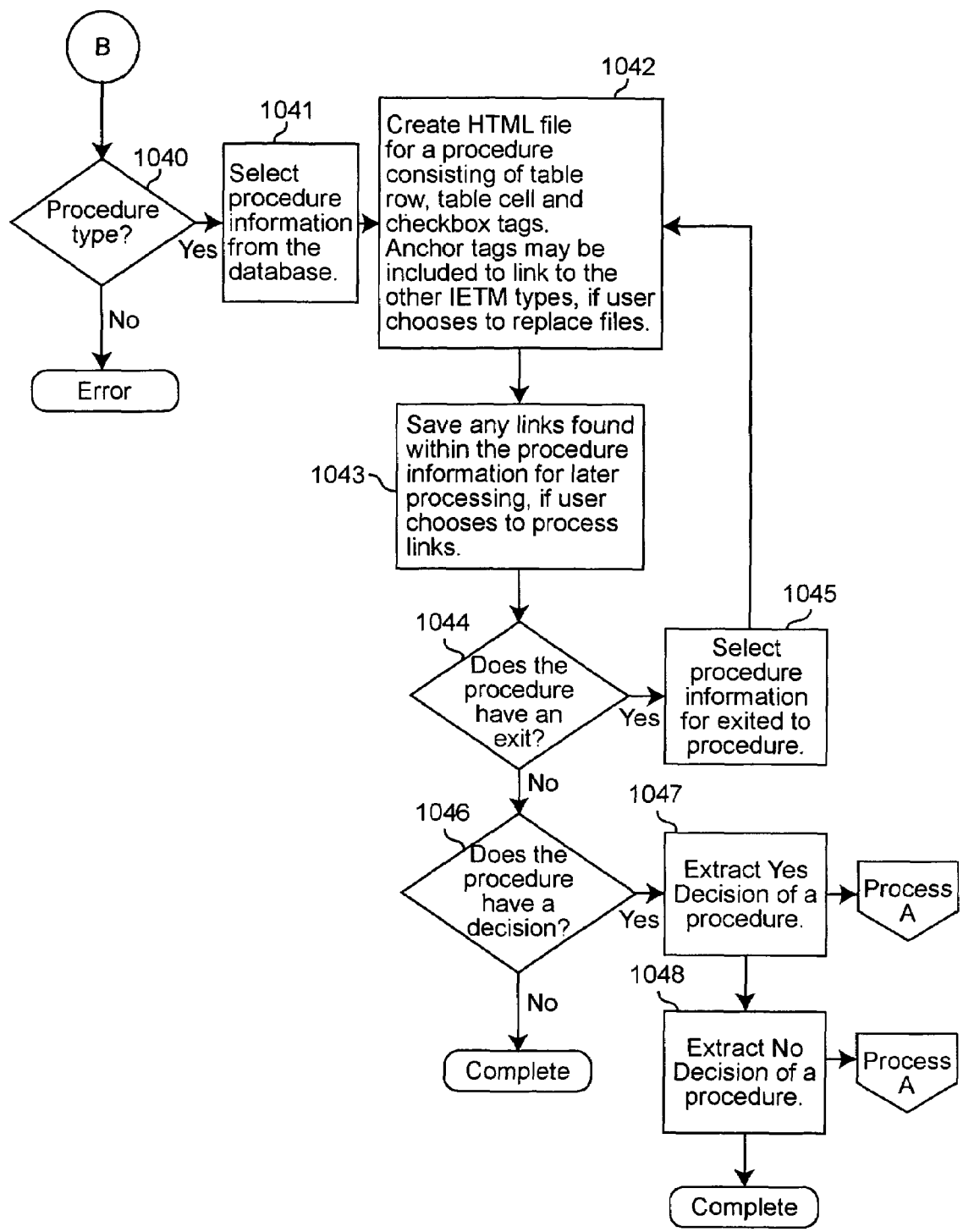

FIGS. 10A and 10B illustrate the preferred method of parsing the selected node or data class as in step 92. First, the IETM data type for the node or data class is determined in block 1001. If it is a menu type as determined in decision block 1002, a starting menu is created from user selected location in block 1003. Child data classes or nodes from the database are selected, given a menu data class in block 1004. An HTML file for a menu consisting of table row and table cell tags for alignment is created in block 1005. A table cell contains an anchor tag for links to sub-menus or IETM objects. Finally, for each child data class or node, the extract process is begun again in block 1006, transferring control to block 1001. If the user chose not to process links in the control selection phase, as described for FIG. 5, then step 1006 is skipped for subordinate links and control is passed back to block 1001.

If the IETM data type for the node or data class is of narrative type, as determined in decision block 1010, then the narrative information is selected from the database in block 1011. An HTML file is created for a narrative consisting of paragraph and anchor tags for links to other IETM objects in block 1012. One should note that if the HTML already exists, and the user chose not to replace all files during the control selection phase, then the existing file is not overwritten, and only new files, for links not previously processed, are created. Any links found within the narrative information are saved for later processing in block 1013, if the user selected links to be processed in the control selection phase, and the parsing of this node is now complete.

If the IETM data type for the node or data class is of graphic type as determined in decision block 1020, then the graphic information is selected from the database in block 1021. An HTML file is created for a graphic consisting of an image map with area tags for links to other IETM objects in block 1022. Any links found within the graphic information are saved for later processing in block 1023 and the parsing of this node is now complete.

If the IETM data type for the node or data class is of table type as determined in decision block 1030, then the table information is selected from the database in block 1031. An HTML file is created for a table consisting of table header, table row, and table cell tags in block 1032. Each cell may contain anchor tags to other IETM objects. Any links found within the table information are saved for later processing in block 1033 and the parsing of this node is now complete.

If the IETM data type for the node or data class is of procedure type as determined in decision block 1040, then the procedure information is selected from the database in block 1041. An HTML file is created for a procedure consisting of table row, table cell tags and checkbox tags in block 1042. Anchor tags may be included to link to the other IETM data types. Any links found within the table information are saved for later processing in block 1043 and the parsing. A test to determine whether the procedure has an exit is performed in decision block 1044. If there is an exit, then procedure information for the exited-to procedure is selected in block 1045 and another HTML file is created in block 1042. Otherwise, a test to determine whether the procedure has a decision is performed in decision block 1046. If there is a decision, then the Yes portion of the procedure is recursively extracted in 1047 and then the No portion of the procedure is recursively extracted in block 1048. Otherwise, if there was no decision then the processing for this node is complete.

Utilizing the database generated auto-increment numerical fields, the Extract process converts the hierarchical data properties from the relational database into relative addressing for presentation in a Web browser. Links and relationships and between the IETM nodes are retained utilizing a common and consistent data storage structure. The numerical directories utilized for data storage and naming do not hinder data maintenance. All data is intended to be maintained in the relational database.

Each IETM data type is represented by one HTML page except in the case of the procedure data type. The IETM data is structured hierarchically in a tree, starting with menu items that are hyperlinked to either child menus or one of the other IETM data types. In turn, the child menu could link to another child menu or one of the other IETM data types. The last node in the tree cannot be a child menu; it must be either a text, graphic, table or procedure data type. A menu item can only be linked from another menu item. The Extract process uses recursion to traverse the tree, generating HTML files for each IETM data type encountered.

Figure 11:
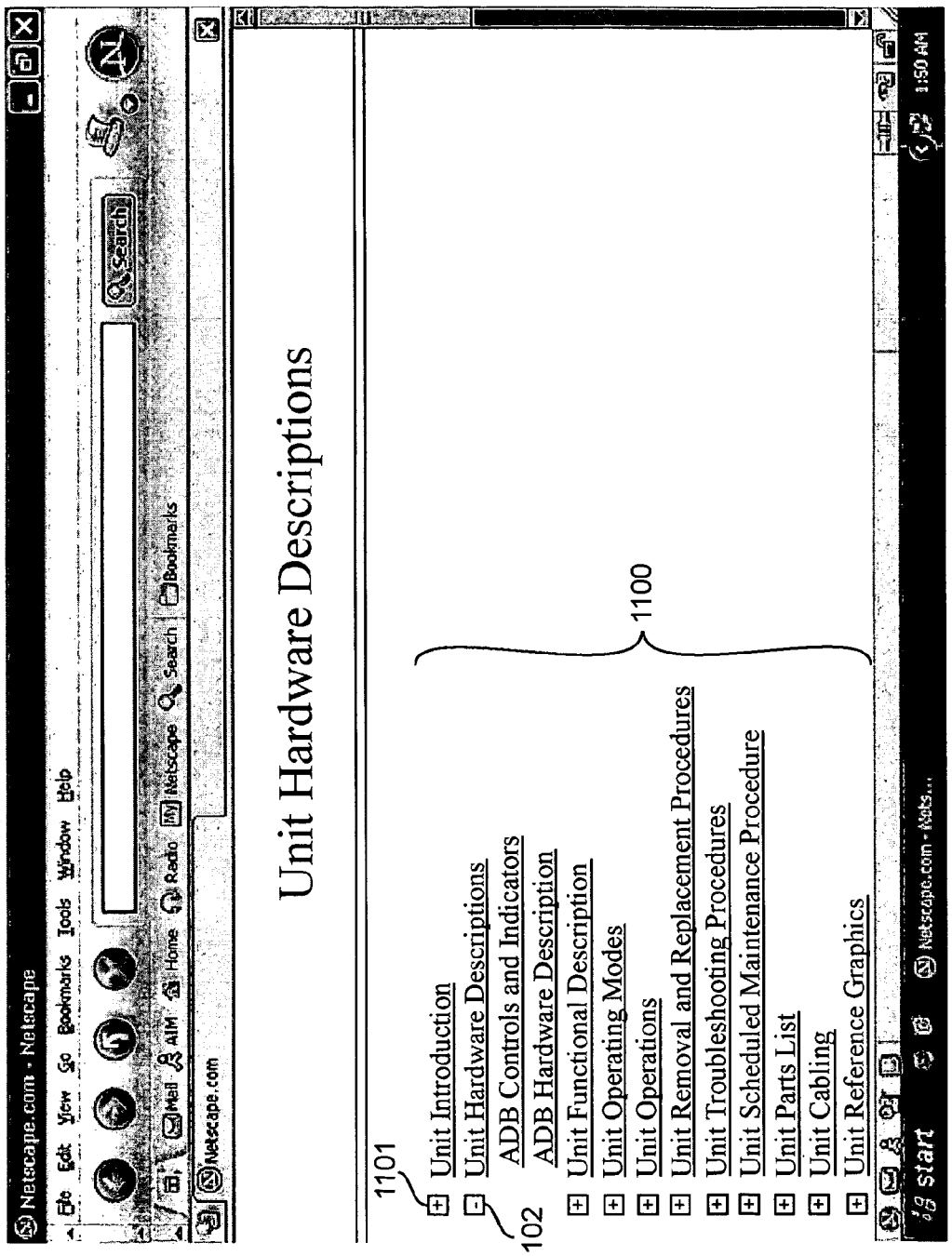
FIG. 11 shows a top level menu of the Extracted IETM with one item expanded.

FIG. 11 shows an example of a top level menu 1100 for an Acoustic Data Base. The functionality of the HTML generated menu structure mimics the functionality of a tree view. A graphic image of a plus sign 1101 is displayed before each menu item in the top level HTML page. When a menu item is clicked, the child menu is displayed "expanded" underneath the menu item clicked with the graphic image of a plus sign preceding each child menu item and a graphic image of a minus sign 1102 preceding the parent menu item.

FIG. 12 shows an excerpt of HTML code generated by the Extract process for a table object. When processing a table object, the Extract process reads the table header, row and column information stored in the IETM relational database and generates the appropriate HTML table header 1201, table row 1202, 1203 and 1204 and table cell tags 1205.

FIG. 13 shows an excerpt of HTML code generated by the Extract process for a graphic object. When processing a graphic object, the Extract process reads the graphic file name and hot spot coordinates from the connected database and generates an HTML image map using the graphic file name 1301. The hot spot coordinates are used to generate area tags 1302 within the image map to link to other IETM data types. The bottom of a graphic page may also contain graphic images of buttons that link to other IETM data types 1303.

FIG. 14 shows an excerpt of HTML code generated by the Extract process for a text object. Similarly, for text data, the Extract process reads the textual information from the connected IETM relational database and generates corresponding paragraph tags 1401 to represent the data in HTML.

A text, table, graphic or procedure data type may contain one or more links to other IETM data type(s), except the menu type. When the Extract process encounters a link to another data type, an HTML anchor tag is written to the file for the data being processed and the application recursively calls itself to process the "linked to" object. The starting date and time is saved in order to avoid extra processing, since one IETM data type can be linked from multiple places. The entire IETM may be generated at once, or incrementally in smaller portions at different times. The user can navigate to the specific piece of the IETM and click a menu option to being the Extract Process.

Figure 15:
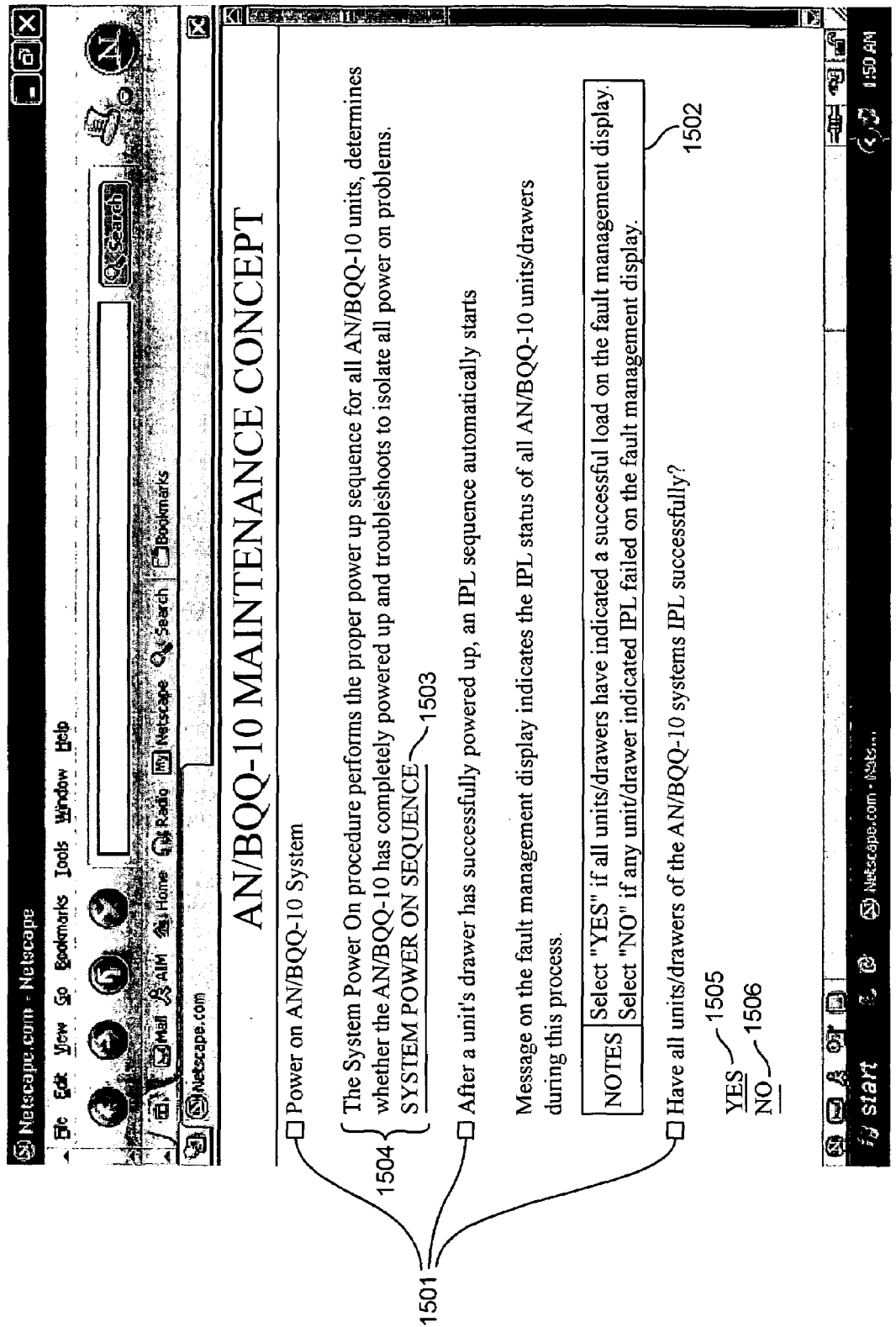
FIG. 15 shows an example of the first page of a procedure generated by the Extract process.

FIG. 15 shows an example of the first page of a procedure generated from the Extract process. When processing a procedure object, the Extract process reads the procedure steps from the IETM relational database. Procedures can be presented in a single HTML file if the procedure does not contain any decisions. If a procedure contains decisions, the preferred method is that the procedure will be presented in multiple HTML files. Although not necessary to the extract process, it has been shown that users desire a method to keep track of which steps in a procedure have been performed. Therefore, a non-functioning check box 1501 precedes each procedure step so that the user/operator can keep track of which steps in the procedure have been performed by checking the boxes. This information only appears on the screen for the current session and is not permanently saved. In order to meet the U.S. government standards for IETM development, but also not necessary to the Extract process, some procedure steps are preceded by warnings, cautions and notes text 1502 that are color-coded red, yellow and blue, respectively. Links to other IETM data types 1503 can be included in a procedure step 1504. Procedures can contain one or more decisions. A decision is a yes-no question. The procedure decision step is followed by a hyperlink titled "Yes" 1505 and a hyperlink titled "No" 1506. Each of these hyperlinks links to other procedure step pages which in turn can contain other decisions.

According to the preferred embodiment of the present invention, the code used to present procedures, as outlined previously, utilizes two levels of recursion. When a procedure is authored, the procedure can exit to other common procedures allowing data sharing and non-replication of data. The final HTML presentation of the IETM must mask the details used in constructing the procedure. The other complicating factor in procedures is the process flow of decision steps. Since procedures with decisions are represented in multiple files, sometime when processing a decision branch of an "exited to" procedure the steps after the exit in the parent procedure need to reside in the HTML file of the decision step of the "exited to" procedure. The steps after the exit in the parent procedure need to be included in the yes and no branch HTML files. Whenever an exit to another procedure is encountered a "recursive look ahead" is performed to determine if the "exited to" procedure or any of its descendants contain decisions. The second use of recursion is used to process the yes and no branches of a decision. The application calls itself to process a new HTML file for the yes branch and a new HTML file for the no branch.

Referring again to FIG. 3, once the data has been extracted and the HTML pages are created, the entire relative addressed Web can be exported for use on a standalone machine in function block 316 and then displayed in function block 318 by a standard Web browser. This method is advantageous for periodic updates of the electronic media because a small subset of the Web can be regenerated as needed and then exported to the user via a disk or even by e-mail. With traditional methods of displaying an IETM, the DBMS is updated (or re-authored) and the custom client-server system must regenerate the pages viewed by the user as needed. This has been problematic because the user's system must remain connected to the DBMS server in order to receive any updated pages. In contrast, the present invention allows the IETM updates to be received on a diskette, or other media, or sent by e-mail, or downloaded by the user and then subsequently quickly installed on the target machine by the user. The IETM can then be viewed on a standalone machine with an ordinary web browser with no connection to a network or DBMS server.

An advantage of the method of the present invention is the operational performance of the extracted web far exceeds the existing Windows™ based presentation products. Testing for both the stand-alone personal computer (PC) based and URL Server based extract Web provided ten (10) times performance improvements in speed of presenting data to the user. This enhances the overall acceptance of the product.

In addition, the HTML Web created by the Extract process is thin server/client. When operated in a server mode (connectivity to the intranet) the application requires only minimal storage and a standard Web server (like Internet Information Service) and only a standard Web browser. The HTML files produced by the Extract process support PC stand-alone operation through 'file serving' using a standard web browser with no plug-ins or personal server application with no loss in functionality.

The preferred embodiment of the present invention operates on IETM databases and is described in more detail above in this context. It would be apparent to one skilled in the art that the present embodiment could be easily modified to operate on any database containing data of a hierarchical nature that is desired to be presented to a user in an easily manipulable and navigable format, such as Web pages. In addition, while the preferred embodiment is designed to read data from a relational database, it would be apparent to one skilled in the art how to modify the invention to parse data stored in any number of formats.

As a perfecting feature of the invention, but not necessary to its practice in accordance with its basic principles, large quantities of engineering data can be warehoused in the Extract database, with supporting data warehousing strategies, as described above. Once the data has been stored in the database using an authoring or similar tool, it is eligible for Extract to HTML for presentation on the Web supporting customer review, thin client data delivery, data archive and enhanced data configuration management. Web base marketing data could also be warehoused and presented using this method. By using the Extract process of the present invention with these and other types of data, virtually any electronic media description can be transformed into a portable web of information.

While the invention has been described in terms of a single preferred embodiment, those skilled in the art will recognize that the invention can be practiced with modification within the spirit and scope of the appended claims.

What is claimed is:

1. A method for generating relative addressed web pages from an electronic media database structure, said method comprising:
   connecting to a database structure having data having a hierarchy and defining an original electronic media description;
   generating a top level menu of structures from said electronic media description;
   selecting, from said menu, a structure to parse;
   parsing said selected structure, wherein the step of parsing said selected menu structure further comprises identifying whether a data object is of type menu, narrative, graphic, table, or procedure; and
   generating tagged data relative web pages that preserve said hierarchy of said original electronic media description in said database structure.

2. A method as recited in claim 1, wherein said hierarchy is preserved by generating links between and among said tagged data relative Web pages which correspond to said original hierarchy of said original electronic media description.

3. A method as recited in claim 1, further comprising selecting interoperability options.

4. A method as recited in claim 3, further comprising converting graphics files to a format selected in the step of selecting interoperability options, wherein a user may choose to convert only graphics files actually referenced in said selected menu structure.

5. A method as recited in claim 1, further comprising displaying status of generating tagged data relative web pages in real time.

6. A method as recited in claim 1, further comprising exporting said relative Web pages to be used in a standalone environment.

7. A method as recited in claim 6, wherein the step of exporting is performed by sending web page updates to a user, said user overwriting existing web pages with said web page updates.

8. A method as recited in claim 1, further comprising displaying said tagged data relative Web pages using a web browser.

9. A method as recited in claim 1, wherein said tagged data relative Web pages are coded in one of the languages selected from the group consisting of Standard Generalized Markup Language (SGML), extensible Markup Language (XML) and HyperText Markup Language (HTML).

10. A method as recited in claim 1 wherein said data object is of type menu, further comprising:
    selecting menu information from said database structure;
    creating a start menu; and
    for each child data class or node, recursively performing said parsing and said generating steps.

11. A method as recited in claim 1 wherein said data object is of type narrative, graphic or table, further comprising:
    selecting object information from said database structure; and
    saving links found within said information for later processing.

12. A method as recited in claim 1 wherein said data object is of type procedure, further comprising:
    selecting procedure information from said database structure;
    saving links found within said procedure information for later processing;
    if there is an exited-to procedure then
        selecting procedure information for an exited-to procedure from said DBMS; and
        recursively performing said parsing and said generating steps for said exited-to procedure; and
    if there is a decision in said procedure comprising a YES portion and a NO portion then
        selecting the YES portion of said procedure and recursively performing said parsing and said generating steps on the YES portion; and
        selecting the NO portion of said procedure and recursively performing said parsing and said generating steps on the NO portion.

13. A method for extracting data from a selected menu structure of an electronic media database structure for generating relative addressed Web pages, said method comprising:
    (a) identifying whether a data object is of type menu, narrative, graphic, table, or procedure, and if said data object is a menu type, creating a starting menu from said selected menu structure;

(b) selecting data object information from said database structure;
(c) creating an HTML file representing said data object;
(d) selectively saving links found within said information for later processing;
(e) if said data object is a procedure type, then if there is an exited-to procedure then
  (1) selecting procedure information for an exited-to procedure from said database structure;
  (2) creating an HTML file representing said exited-to procedure;
  (3) recursively performing steps (b) to (e) for said exited-to procedure; and
(f) if said data object or said exited-to procedure is a procedure type having no exited-to procedure, then if there is a decision in said procedure comprising a YES portion and a NO portion then
  (1) selecting the YES portion of said procedure and recursively performing steps (a) to (f) on the YES portion; and
  (2) selecting the NO portion of said procedure and recursively performing steps (a) to (f) on the NO portion;
(g) processing said saved links; and
(h) repeating steps (a) to (g) for each data object in said selected menu structure.

14. A computer readable medium containing code for extracting data from a selected menu structure of an electronic media database structure for generating relative addressed Web pages, the code implementing steps of:
(a) identifying whether a data object is of type menu, narrative, graphic, table, or procedure, and if said data object is a menu type, creating a starting menu from said selected menu structure;
(b) selecting data object information from said database structure;
(c) creating an HTML file representing said data object;
(d) selectively saving links found within said information for later processing;
(e) if said data object is a procedure type, then if there is an exited-to procedure then
  (1) selecting procedure information for an exited-to procedure from said database structure;
  (2) creating an HTML file representing said exited-to procedure;
  (3) recursively performing steps (b) to (e) for said exited-to procedure; and
(f) if said data object or said exited-to procedure is a procedure type having no exited-to procedure, then if there is a decision in said procedure comprising a YES portion and a NO portion then
  (1) selecting the YES portion of said procedure and recursively performing steps (a) to (f) on the YES portion; and
  (2) selecting the NO portion of said procedure and recursively performing steps (a) to (f) on the NO portion;
(g) processing said saved links; and
(h) repeating steps (a) to (g) for each data object in said selected menu structure.

15. A computer readable medium comprising computer code for extracting data from a selected menu structure of an electronic media database structure for generating relative addressed Web pages, comprising:
a first code section for identifying whether a data object is of type menu, narrative, graphic, table, or procedure, and if said data object is a menu type, creating a starting menu from said selected menu structure;
a second code section for selecting data object information from said database structure;
a third code section for creating an HTML file representing said data object;
a fourth code section for saving links found within said information for later processing;
a fifth code section for recursively processing links and decision branches in procedure type information; and
a sixth code section for processing said saved links.

\* \* \* \* \*